United States Patent
Olsson et al.

(10) Patent No.: US 8,360,520 B2
(45) Date of Patent: Jan. 29, 2013

(54) ANTI-WHIPLASH BACKDRIVE SYSTEM

(75) Inventors: Markus Olsson, Gothenburg (SE);
Jan-Inge Johansson, Mullsjö (SE);
Anders Kvarnström, Jönköping (SE);
Mats Stenholm, Mullsjö (SE)

(73) Assignees: Kongsberg Automotive AB, Mullsjö (SE); Autoliv Development AB, Vargarda (SE)

( * ) Notice: Subject to any disclaimer, the term of this patent is extended or adjusted under 35 U.S.C. 154(b) by 337 days.

(21) Appl. No.: 12/675,680

(22) PCT Filed: Aug. 29, 2007

(86) PCT No.: PCT/IB2007/002614
§ 371 (c)(1),
(2), (4) Date: Feb. 26, 2010

(87) PCT Pub. No.: WO2009/027761
PCT Pub. Date: Mar. 5, 2009

(65) Prior Publication Data
US 2011/0049947 A1    Mar. 3, 2011

(51) Int. Cl.
*B60N 2/42* (2006.01)
(52) U.S. Cl. .................... 297/216.12; 297/408
(58) Field of Classification Search ............ 297/216.12, 297/408
See application file for complete search history.

(56) References Cited

U.S. PATENT DOCUMENTS 5,934,750 A * 8/1999 Fohl .................. 297/216.12
6,749,256 B1 * 6/2004 Klier et al. .......... 297/216.12
6,805,411 B2   10/2004 Gramss et al.
(Continued)

FOREIGN PATENT DOCUMENTS

DE    102004016474 B3    8/2005
DE    102004035583 A1    2/2006
(Continued)

OTHER PUBLICATIONS

European Search Report for Application No. EP 07 80 4901; mailed Jun. 7, 2011; 5 pages.
(Continued)

*Primary Examiner* — Peter R. Brown
(74) *Attorney, Agent, or Firm* — Howard & Howard Attorneys PLLC

(57) ABSTRACT

The present invention relates to an anti-whiplash system for the use in vehicle seats. The inventive anti-whiplash system for the use in vehicle seats comprises a head restraint (1) mounted on the backrest of a vehicle seat, wherein the head restraint (1) comprises a release mechanism for reducing the gap between an occupant's head and the head restraint in case of an accident, said release mechanism comprises a movable part (5) and a stationary part (3), wherein a clearance between the movable part (5) and the stationary part (3) opens up when the release mechanism is released, characterized in that a wedging body (4) is provided having a small width portion and a large width portion and an intermediate increasing width portion, wherein the wedging body (4) points with its small width portion towards the clearance between the movable part (5) and the stationary part (3), and in that the wedging body (4) is movable and preloaded to move into the clearance as it opens up to thereby abut against the movable part (5) and against the stationary part (3) in order to prevent the movable part (5) of the head restraint (1) from moving back.

14 Claims, 9 Drawing Sheets

U.S. PATENT DOCUMENTS

| | | | |
|---|---|---|---|
| 7,111,901 B2 | 9/2006 | Schlierf et al. | |
| 7,118,174 B2 * | 10/2006 | Lee | 297/216.12 |
| 7,588,289 B2 * | 9/2009 | Bostrom et al. | 297/216.12 |
| 7,631,932 B2 | 12/2009 | Hoffmann | |
| 8,029,055 B2 * | 10/2011 | Hartlaub | 297/216.12 |
| 2001/0040396 A1 | 11/2001 | Kreuels et al. | |
| 2005/0077762 A1 | 4/2005 | Kramer et al. | |
| 2006/0273636 A1 * | 12/2006 | Sugimoto | 297/216.12 |
| 2007/0246989 A1 * | 10/2007 | Brockman | 297/391 |
| 2008/0073951 A1 * | 3/2008 | Hattori et al. | 297/216.12 |

FOREIGN PATENT DOCUMENTS

| | | |
|---|---|---|
| DE | 102004059237 B3 | 2/2006 |
| EP | 1800944 A2 | 6/2007 |

OTHER PUBLICATIONS

International Search Report for International Application No. PCT/IB2007/002614, mailed May 5, 2008; 3 pages.

\* cited by examiner

Fig. 6
Fig. 7
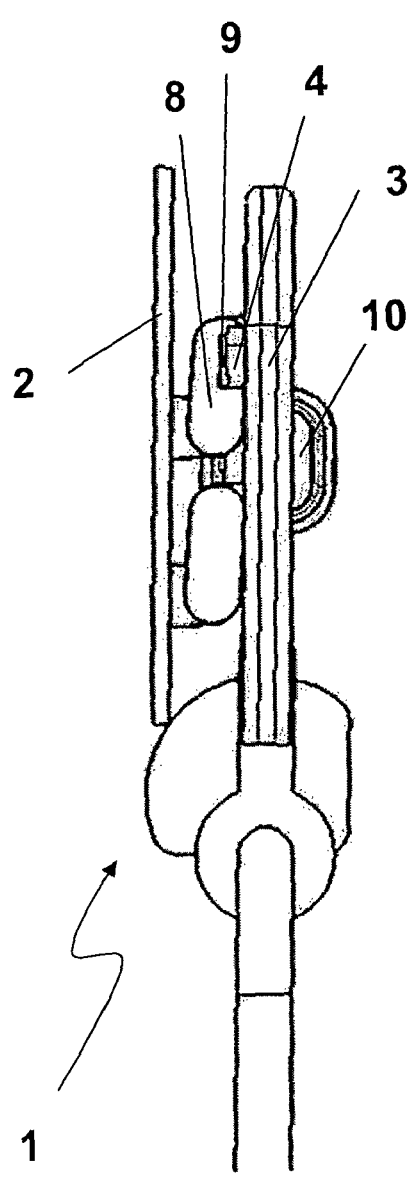
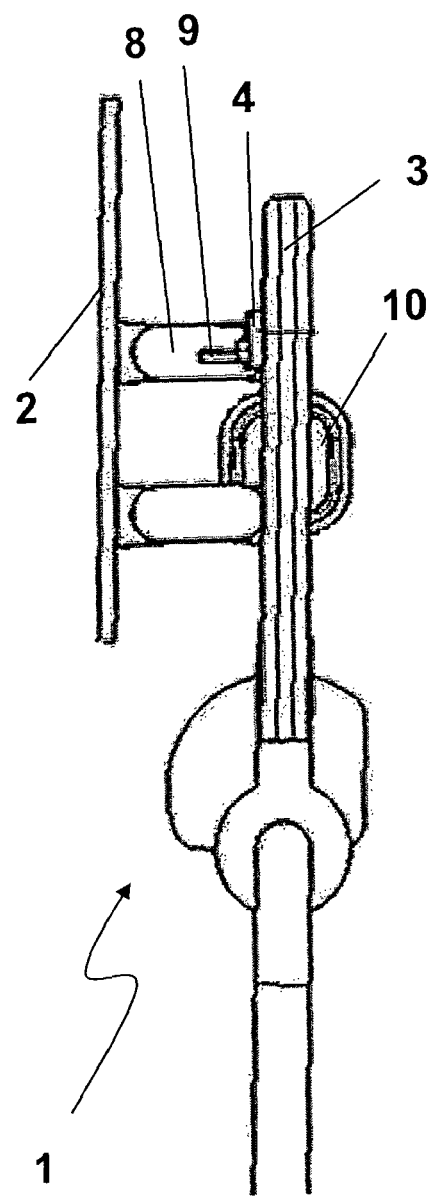

ANTI-WHIPLASH BACKDRIVE SYSTEM

The subject patent application claims priority to and all the benefits of International Application No. PCT/IB2007/002614, which was filed on Aug. 29, 2007 with the World Intellectual Property Organization, the disclosure of which is hereby incorporated by reference.

The present invention relates to an anti-whiplash system for the use in vehicle seats.

It is important for the safety in vehicles to reduce the Neck-Injury-Criterion level in case of crashes, in particular of a rear-end impact accident. Rear-end collisions are rarely fatal, but they give rise to fully one quarter of all personal injuries, often with permanent impairment, and to extended sick-leave and inability to work. In addition to the human suffering, these injuries account in many countries for more than 50% of all insurance claims and costs for societies for personal injuries sustained by car occupants.

These whiplash injuries have been linked to a too large gap between the head restraint of the vehicle seat and an occupant's head. In case of a rear-end collision the occupant's body is accelerated forward whereas the head of the occupant accelerates in the gap backwards relative to the vehicle by virtue of its inertia. Thus, the closer the gap is the less the head is dangerously accelerated backwards relative to the vehicle.

Head restraint systems reducing the gap between the head restraint of the vehicle seat and an occupant's head in case of an accident are for example known from U.S. Pat. No. 6,805,411 B2, U.S. Pat. No. 7,111,901 B2 or US 2001/0040396 A1.

U.S. Pat. No. 6,805,411 B2 describes a neck rest for the seats of automobiles with a pivotably supported movable cushion member. Upon actuation of the comprised actuation means the cushion member is moved into an actuated position towards the head of a person seating on the seat. Stop means prevent the cushion member from pivoting back when it has attained its actuated position.

The head restraint described in U.S. Pat. No. 7,111,901 B2 comprises a cylinder mounted on the main head restraint body that moves a head-engaging member along a slide displaceable in a straight line axially along the cylinder in an outer activated position upon actuation in case of an accident. Return-lock means comprising a locking tooth and a countertooth prevent the head-engaging member from returning back towards its initial position.

All the above-mentioned anti-whiplash systems known from the prior art have the disadvantage that they are rather complex. The complex mechanical setup therein is relatively expensive with regard to production costs. Especially the known backdrive prevention systems as a vital feature of an anti-whiplash system exhibit a restricted range of use. The backdrive prevention systems known from the prior art are restricted to lock the deployed head restraint in predefined positions if not just in the activated position.

It is therefore the object of the present invention to provide for a simple and inexpensive anti-whiplash system for the use in vehicle seats with an active head restraint. Furthermore, the anti-whiplash system should comprise means for a continuous backdrive prevention such that the head restraint is prevented from returning out of any activated position to provide a secure head support at any moment during the activation process.

This object is achieved according to the present invention by the features of claim 1. Preferred embodiments of the invention are subject of the dependent claims.

According to the present invention an anti-whiplash system for the use in vehicle seats comprising a head restraint mounted on the backrest of a vehicle seat is provided, wherein the head restraint comprises a release mechanism for reducing the gap between an occupant's head and the head restraint in case of an accident, said release mechanism comprises a movable part and a stationary part, wherein a clearance between the movable part and the stationary part opens up when the release mechanism is released, characterised in that a wedging body is provided having a small width portion and a large width portion and an intermediate increasing width portion, wherein the wedging body points with its small width portion towards the clearance between the movable part and the stationary part, and in that the wedging body is movable and preloaded to move into the clearance as it opens up to thereby abut against the movable part and against the stationary part in order to prevent the movable part of the head restraint from moving back.

Preferably, the movable wedging body is preloaded by a spring. More preferably, the movable wedging body is urged to gradually rotate into the clearance when the release mechanism is released in order to prevent the movable part of the head restraint from moving back. Thereby, the wedging body gradually fills the clearance as it opens up between the movable part and the stationary part of the release mechanism and abuts against the movable part and against the stationary part.

Preferably, the movable wedging body is an essentially wedge-shaped body. The essentially wedge-shaped body may comprise a sloped surface creating an increased thickness of the body from the small width portion via the intermediate increasing width portion to the large width portion. The wedge-shaped body may be oriented with its apex or small width portion towards the clearance and may slide into the clearance as it opens up.

More preferably, the wedging body is rotatable and comprises a helically shaped surface portion winding up from the small width portion via the intermediate increasing width portion to the large width portion. The wedging body may essentially have the shape of a disc segment that is rotatable about its central axis. The disc segment may comprise one surface having essentially the shape of a circle segment that winds up from the small width portion via the intermediate increasing width portion to the large width portion following a helix. Alternatively, the wedging body may have the shape of a segment of a ring, the ring having an annular surface winding up from the small width portion via the intermediate increasing width portion to the large width portion.

In a first preferred embodiment of the invention the release mechanism is arranged to pivot the head restraint forward with respect to the backrest of the vehicle seat such that an angular-shaped clearance between the movable part and the stationary part opens up near the pivot axis when the release mechanism is deployed and the movable wedging body is urged to move into the angular-shaped clearance.

In a second preferred embodiment of the invention the movable part comprises a head engaging member and at least one rotatable cam attached to the head engaging member. The rotatable cam is also rotatably attached to the stationary part, such that the gap between the head engaging member and the stationary part is increased upon rotation of the cam. The cam comprises an extension such that the extension follows a circular path away from the stationary part when the cam rotates, such that the clearance opens up between the extension of the cam and the stationary part. The movable wedging body is preloaded to move into the clearance as it opens up to thereby abut against the extension of the cam and against the stationary part in order to prevent the movable part of the head restraint from moving back.

Preferably, the release mechanism comprises a returning mechanism for returning the head restraint into its initial position after the release mechanism has been released, wherein the returning mechanism comprises means for returning the movable wedging body back into its initial preloaded position. The returning mechanism can be deployed by pressing a button or turning a rotary handle.

It should be understood that apart from the embodiments described herein other configurations of the inventive anti-whiplash system are possible. The invention is applicable in any configuration where a clearance opens up in the release mechanism.

In the following, a preferred embodiment of the invention is described in detail with references to the accompanying FIGS. 1 to 12, where FIGS. 1 to 5 refer to a first embodiment of the invention and FIGS. 6 to 12 refer to a second embodiment of the invention.

FIG. 6 shows a side view of a head restraint provided with an inventive anti-whiplash system in an initial state.

FIG. 7 shows a side view of a head restraint provided with an inventive anti-whiplash system in an activated state.

Figure 1:
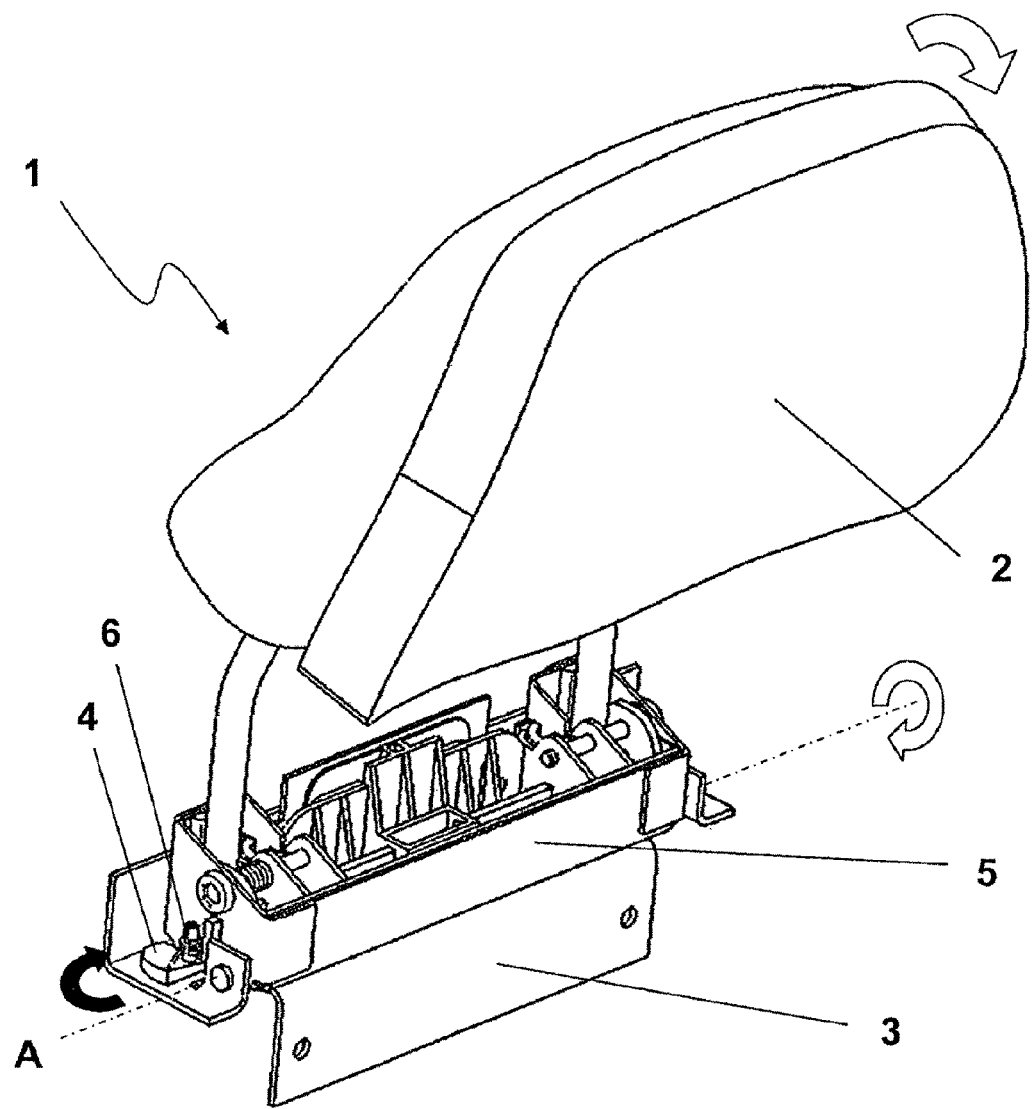
FIG. 1 shows a perspective view of a head restraint provided with an inventive anti-whiplash system in an initial state.
Figure 2:
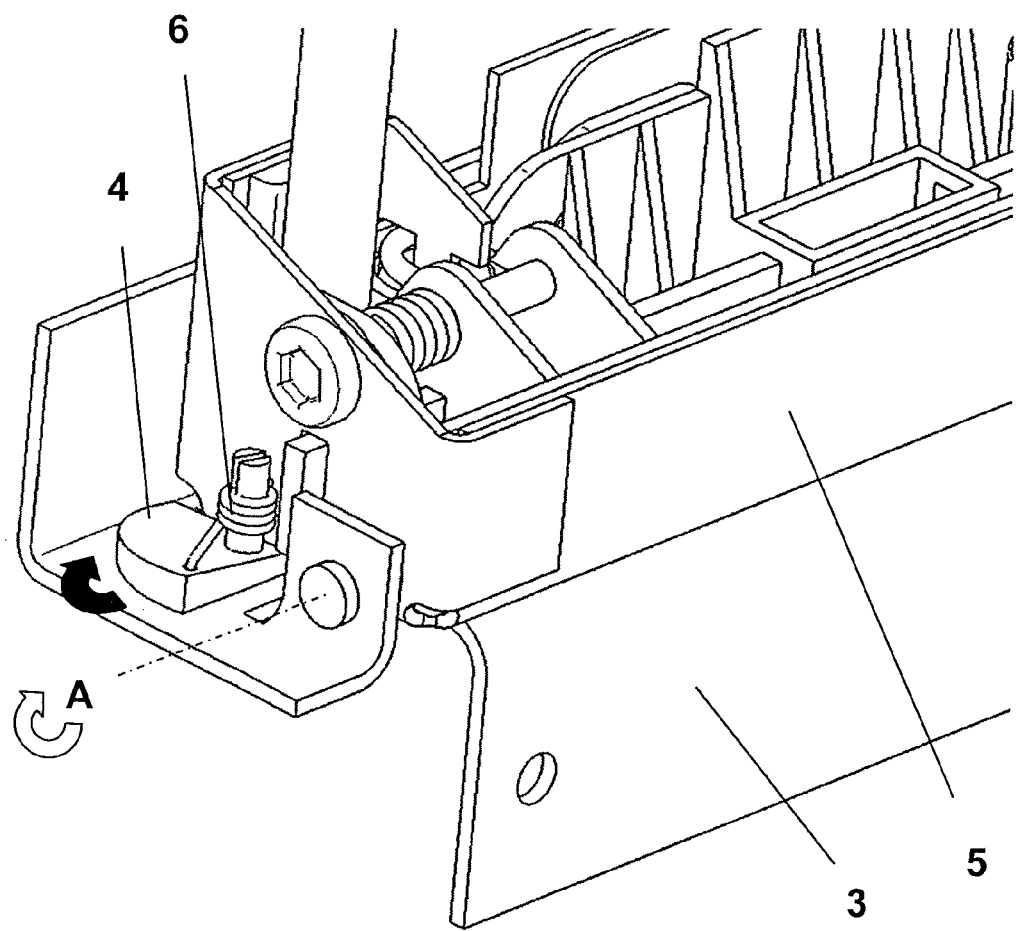
FIG. 2 shows a detailed perspective view of the backdrive prevention system in an initial state.
Figure 3:
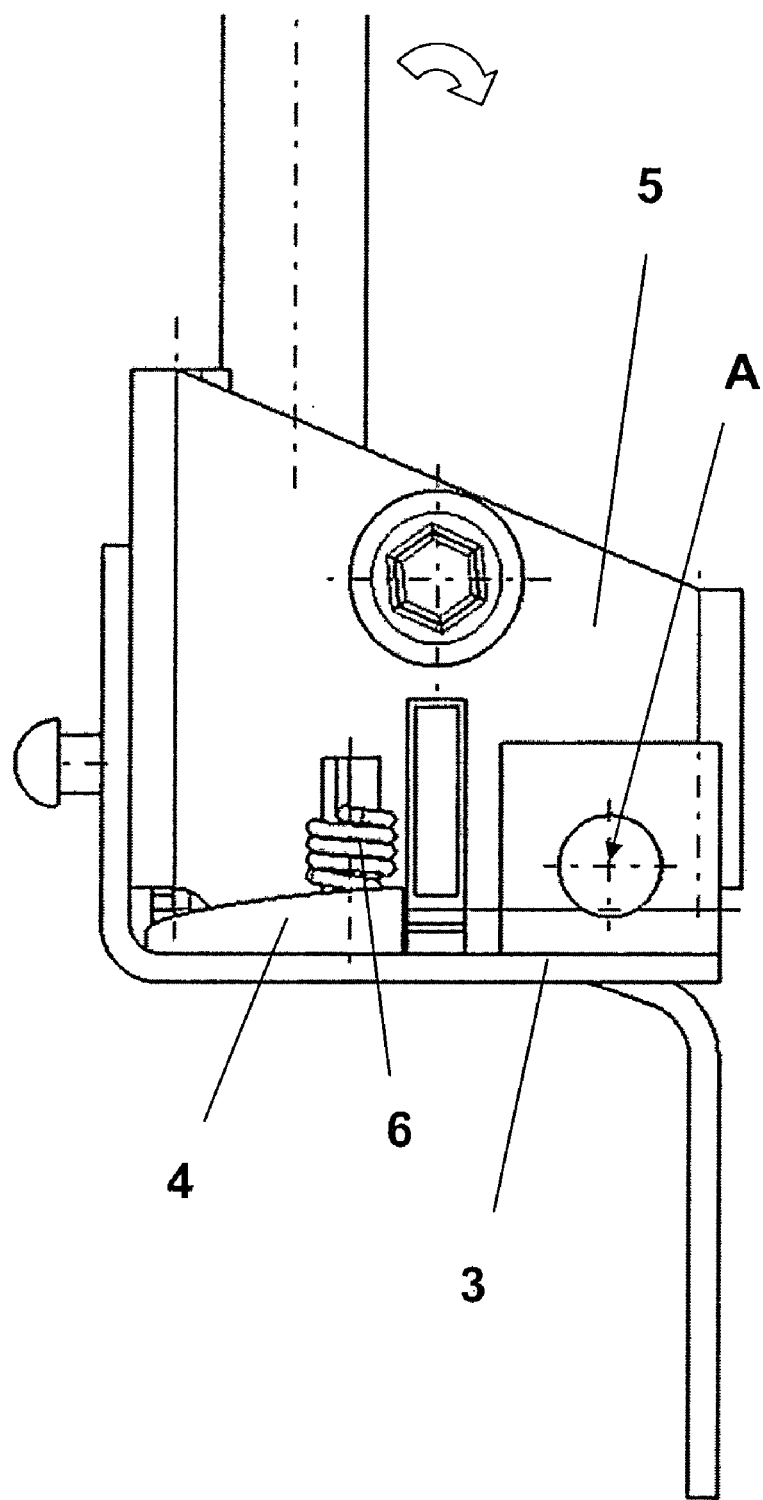
FIG. 3 shows a detailed side view of the backdrive prevention system in an initial state.

The active head restraint 1 shown in FIGS. 1 to 3 comprises a release mechanism for reducing the gap between an occupant's head and the head restraint in case of an accident. The head-engaging member 2 is mounted on a cassette comprising essentially a movable part 5 and a stationary part 3. The stationary part 3 is mounted on the backrest of a vehicle seat (not shown). The movable part 5 is connected pivotably about an across-vehicle axis A to the stationary part 3. Upon activation of the anti-whiplash system the movable part 5 pivots forward and moves the attached head-engaging member 2 essentially towards an occupant's head (not shown) such that the gap between the head restraint and an occupant's head is reduced. At one or both lateral sides of the cassette there is a wedging body 4 connected rotatably about a vertical axis to the stationary part 3 of the cassette. By means of a spring 6 the wedging body 4 is preloaded and abuts with its small width portion against the movable part 5 adjacent to the clearance between the movable part 5 and the stationary part 3 that open up upon a forward pivot movement of the movable part 5 about the cross-vehicle axis A during an activation process.

Figure 4:
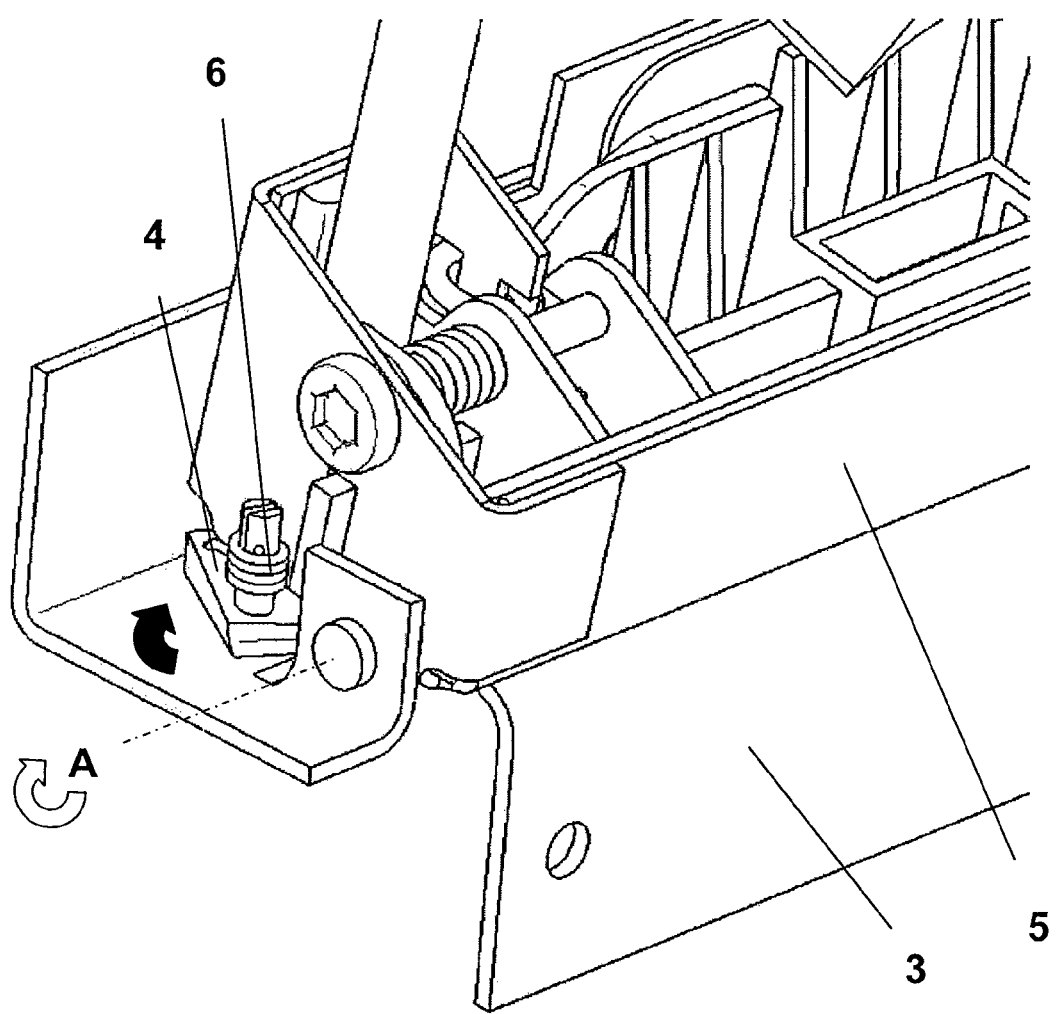
FIG. 4 shows a detailed perspective view of the backdrive prevention system in an activated state.
Figure 5:
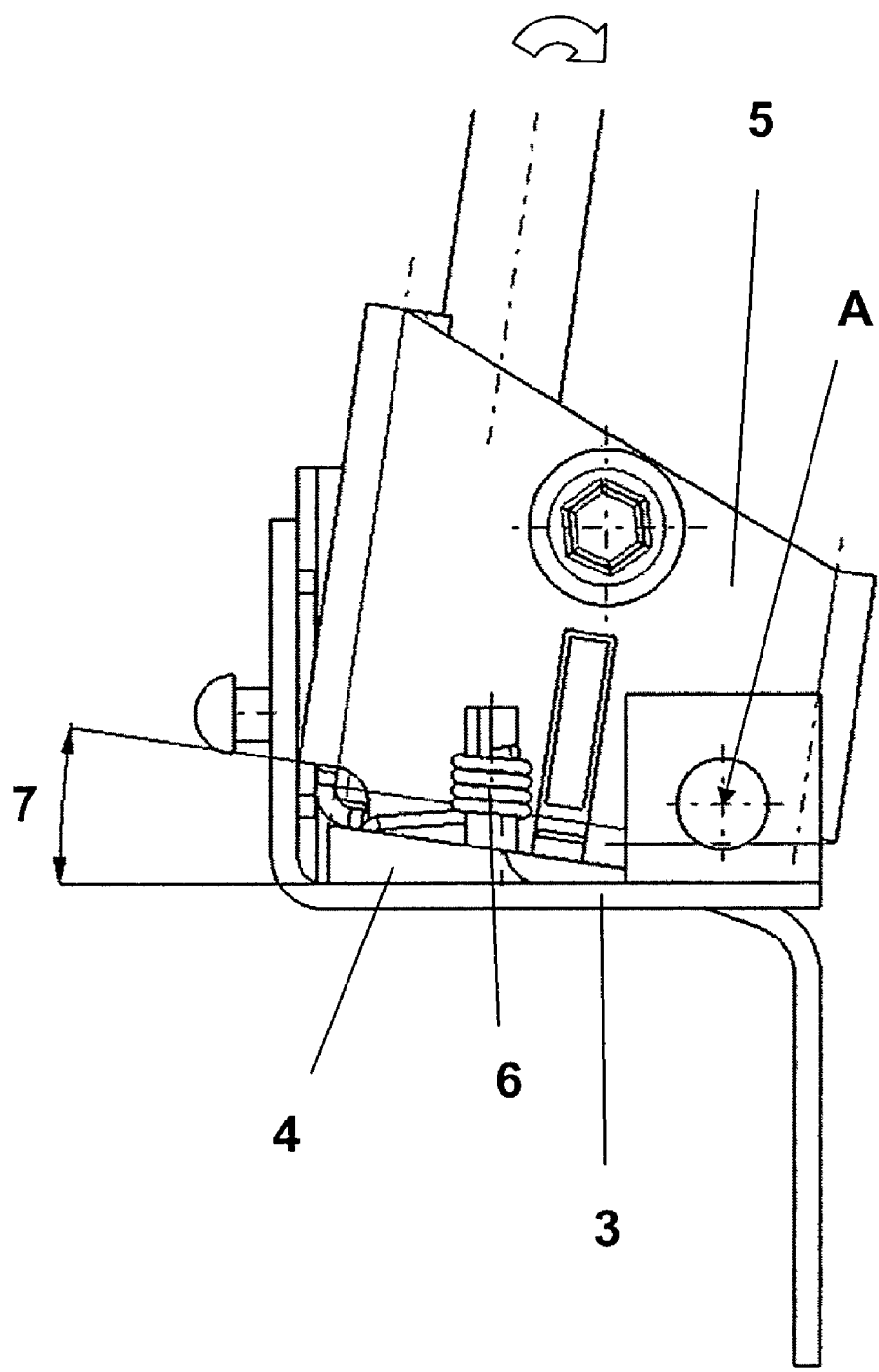
FIG. 5 shows a detailed side view of the backdrive prevention system in an activated state.
Figure 8:
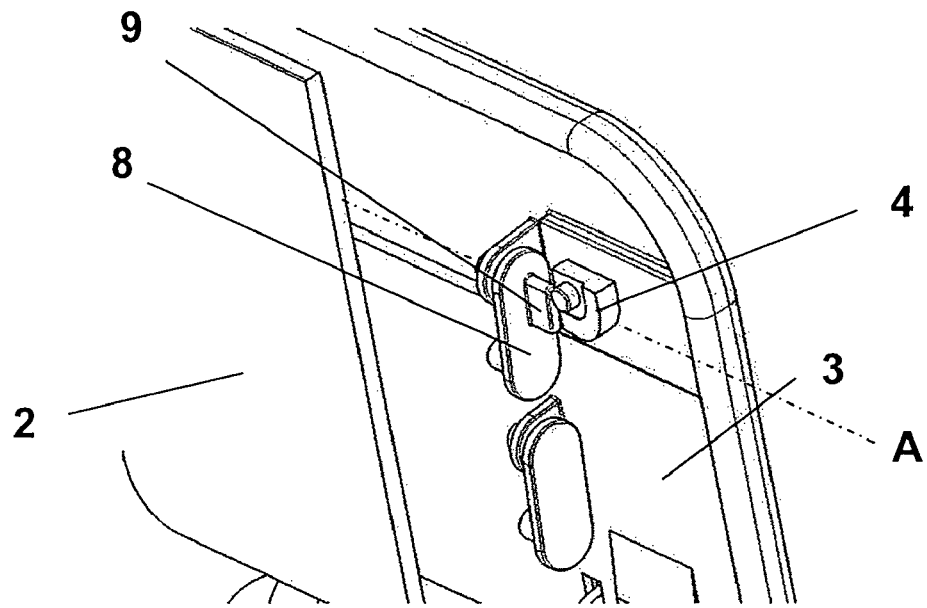
FIG. 8 shows a detailed perspective view of the backdrive prevention system in an initial state.
Figure 9:
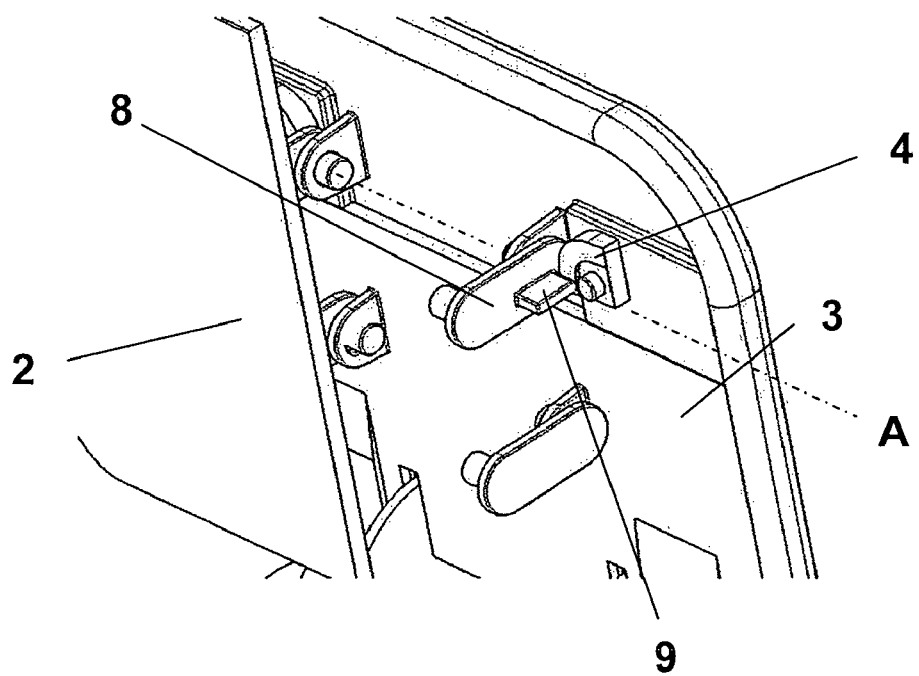
FIG. 9 shows a detailed perspective view of the backdrive prevention system in an activated state.
Figure 10:
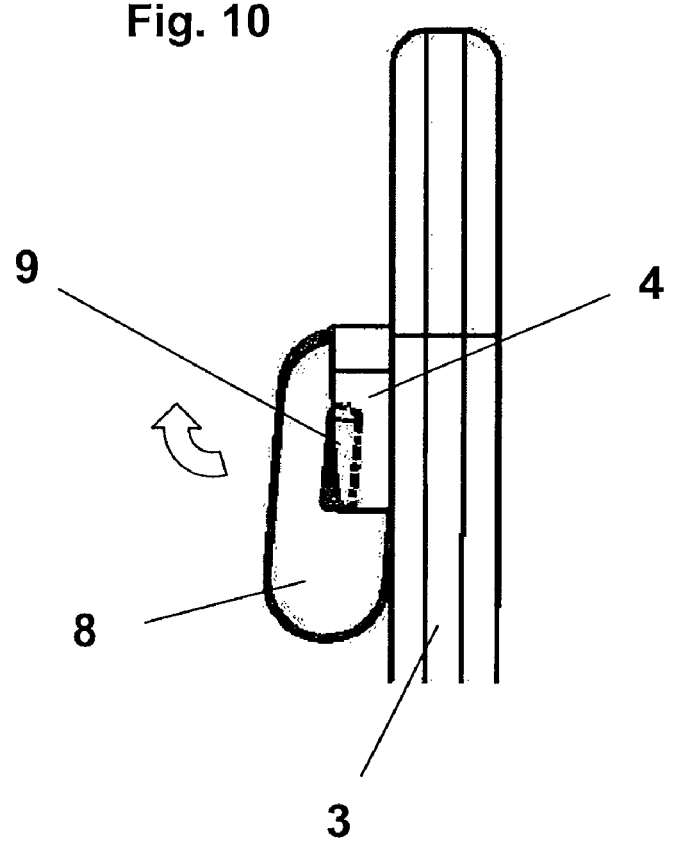
FIG. 10 shows a detailed side view of a head restraint provided with an inventive anti-whiplash system in an initial state.
Figure 11:
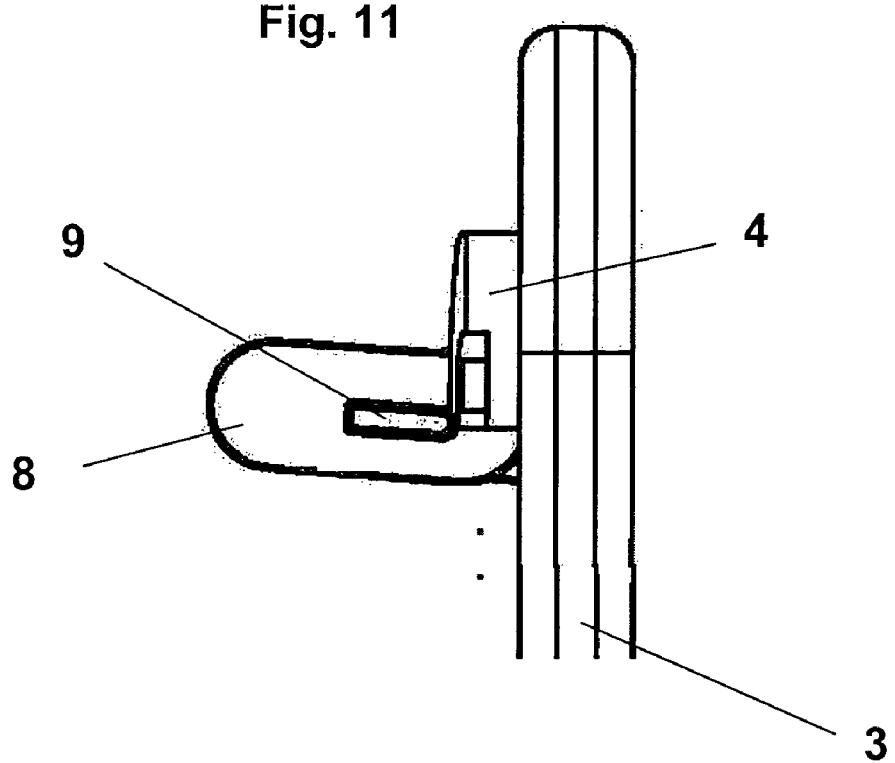
FIG. 11 shows a detailed side view of a head restraint provided with an inventive anti-whiplash system in an activated state.
Figure 12:
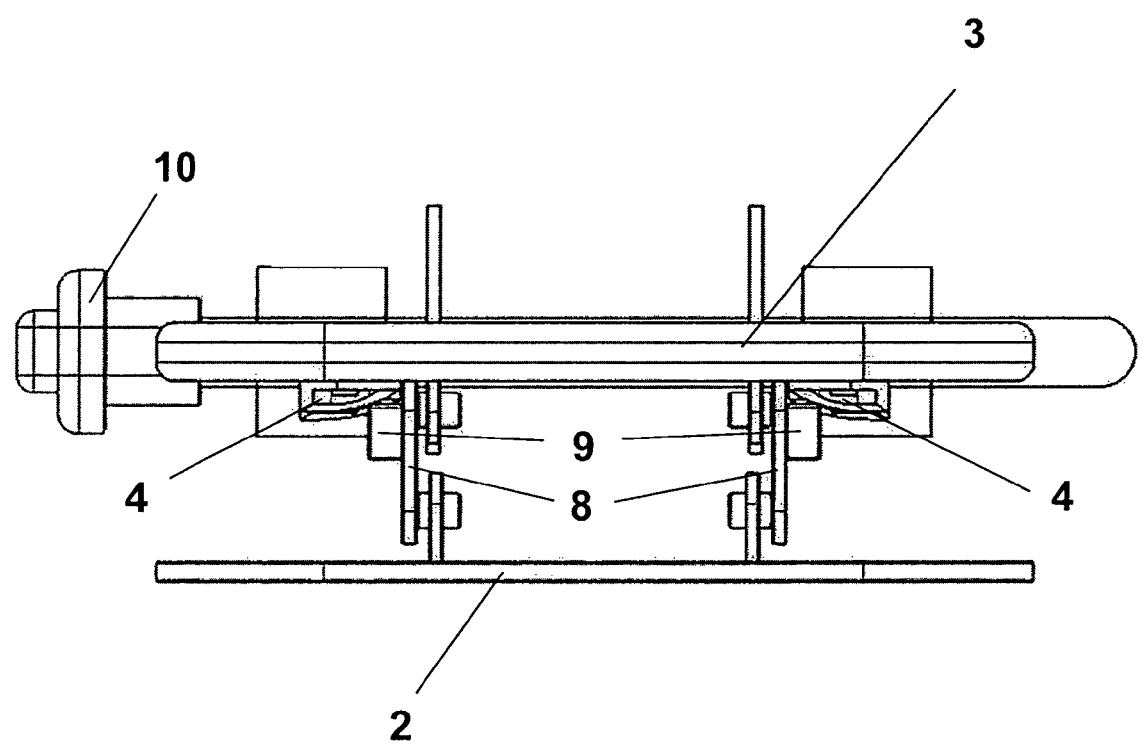
FIG. 12 shows a top view of a head restraint provided with an inventive anti-whiplash system in an activated state.

FIGS. 4 and 5 show the active head restraint 1 in an activated state where the gap between an occupant's head and the head restraint is reduced by a forward pivot movement of the movable part 5 about the cross-vehicle axis A. Upon such a forward pivot movement a clearance in form of an angle 7 opens up. The clearance is filled gradually by the preloaded movable wedging body 4 that rotates about a vertical axis into the clearance and prevents the movable part 5 of the head restraint 1 from moving back.

A second embodiment of the invention is shown in FIGS. 6 to 12. In this embodiment the head-engaging member 2 is connected to at least one rotatable cam 8 such that the gap between an occupant's head and the head-engaging member 2 is reduced upon a concerted rotation of the cam 8 about an across-vehicle axis. The preloaded movable wedging body 4 is urged to move into a clearance that opens up upon rotation of the cam 8 in order to prevent the cams 8 from rotating back. The cam 8 comprises an extension 9 provided on the surface of the cam 8 such that the extension 9 follows a circular path away from the stationary part 3 when the cam 8 rotates about an across-vehicle axis A upon actuation of the anti-whiplash system. The clearance opens up between the extension 9 on the cam 8 and the stationary part 3 of the release mechanism. As can be seen in FIGS. 6 to 12 the wedging body 4 is connected rotatably about an alongside-vehicle axis to the stationary part 3. By means of a spring the wedging body 4 is preloaded and abuts with its small width portion against the extension 9 of the cam 8. The clearance between the extension 9 of the cam 8 and the stationary part 3 opens up upon a rotation of the cam 8 about an across-vehicle axis A during an activation process. As soon as the clearance is large enough to engage the small width portion of the wedging body 4 the wedging body 4 rotates about an alongside-vehicle axis such that it fills the clearance and prevents the cam 8 from moving back. When the cam 8 has reached the activated position as shown in FIGS. 7, 9, 11 and 12 the clearance is maximally opened-up and the wedging body 4 has reached its final blocking position.

The release mechanism comprises a returning mechanism (10) for returning the head restraint to an initial position after the release mechanism has been released. The returning mechanism comprises means for returning the movable wedging body back to an initial preloaded position.

The invention claimed is:

1. An anti-whiplash system for use with vehicle seats, the system comprising:
   a head restraint adapted for coupling to the vehicle seat with the head restraint comprising,
      a release mechanism coupled to the head restraint for reducing a gap between an occupant's head and the head restraint during an accident, wherein the release mechanism comprises;
         a stationary part for mounting the head restraint to the vehicle seat with the stationary part defining an axis, and
         a moveable part connected pivotably about the axis of the stationary part such that rotation of the moveable part from an initial position toward an activated position about the axis creates a clearance between the movable part and the stationary part, and
      a wedging body rotatably coupled to the stationary part adjacent the movable part with the wedging body rotatable into the clearance between the movable part and the stationary part as the clearance is created such that the wedging body abuts against the movable part and against the stationary part within the clearance to prevent the movable part from moving back to the initial position.

2. A system according to claim 1, wherein the wedging body is preloaded by a spring.

3. A system according to claim 2, wherein the wedging body is an essentially wedge-shaped body.

4. A system according to claim 3, wherein the wedging body comprises a helically shaped surface portion winding up from a small width portion of the wedging body toward a large width portion of the wedging body.

5. A system according to claim 4, wherein the helically shaped surface portion of the wedging body is urged to gradually rotate into the clearance to prevent the movable part of the head restraint from moving back to the initial position.

6. A system according to claim 2, wherein the release mechanism pivots the movable part of the head restraint forward with respect to the vehicle seat such that the clearance between the movable part and the stationary part is angular shaped and the wedging body is urged to move into the angular-shaped clearance.

7. A system according to claim 2, wherein the movable part comprises a head engaging member and at least one rotatable cam attached to the head engaging member, wherein the rotatable cam is rotatably attached to the stationary part such that the gap between the head engaging member and the stationary part increases upon rotation of the cam, wherein the cam comprises an extension with the extension following a circular path away from the stationary part when the cam rotates such that the clearance is created between the extension of the cam and the stationary part, and wherein the wedging body is rotatable into the clearance as the clearance opens up such that the wedging body abuts against the extension of the cam and against the stationary part to prevent the movable part from moving back to the initial position.

8. A system according to claim 2, wherein the release mechanism comprises a returning mechanism for returning the head restraint to the initial position after the release mechanism has been released, wherein the returning mechanism comprises means for removing the wedging body from the clearance between the movable part and the stationary part.

9. A system according to claim 1, wherein the wedging body is an essentially wedge-shaped body.

10. A system according to claim 9, wherein the wedging body comprises a helically shaped surface portion winding up from a small width portion of the wedging body toward a large width portion of the wedging body.

11. A system according to claim 10, wherein the helically shaped surface portion of the wedging body is urged to gradually rotate into the clearance to prevent the movable part of the head restraint from moving back to the initial position.

12. A system according to claim 1, wherein the release mechanism pivots the movable part of the head restraint forward with respect to the vehicle seat such that the clearance between the movable part and the stationary part is angular shaped and the wedging body is urged to move into the angular-shaped clearance.

13. A system according to claim 1, wherein the movable part comprises a head engaging member and at least one rotatable cam attached to the head engaging member, wherein the rotatable cam is rotatably attached to the stationary part such that the gap between the head engaging member and the stationary part increases upon rotation of the cam, wherein the cam comprises an extension with the extension following a circular path away from the stationary part when the cam rotates such that the clearance is created between the extension of the cam and the stationary part, and wherein the wedging body is rotatable into the clearance as the clearance opens up such that the wedging body abuts against the extension of the cam and against the stationary part to prevent the movable part from moving back to the initial position.

14. A system according to claim 1, wherein the release mechanism comprises a returning mechanism for returning the head restraint to the initial position after the release mechanism has been released, wherein the returning mechanism comprises means for removing the wedging body from the clearance between the movable part and the stationary part.

* * * * *